C. ANDRADE, Jr.
PROPELLER PULLER.
APPLICATION FILED JUNE 2, 1910.

985,491.

Patented Feb. 28, 1911.

WITNESSES:
David J. Walsh
Samuel D. Lindsay

INVENTOR
Cipriano Andrade Jr.

UNITED STATES PATENT OFFICE.

CIPRIANO ANDRADE, JR., OF NEW YORK, N. Y.

PROPELLER-PULLER.

985,491.  Specification of Letters Patent.  Patented Feb. 28, 1911.

Application filed June 2, 1910. Serial No. 564,700.

*To all whom it may concern:*

Be it known that I, CIPRIANO ANDRADE, Jr., a citizen of the United States, residing at 328 West Eighty-fourth street, in the city of New York, in the county of New York and State of New York, have invented a new and useful Propeller-Puller, of which the following is a specification.

Figure 1:
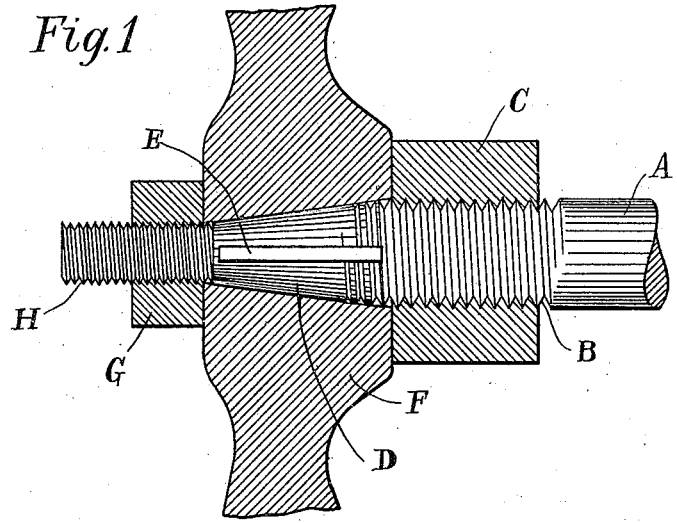
Figure 2:
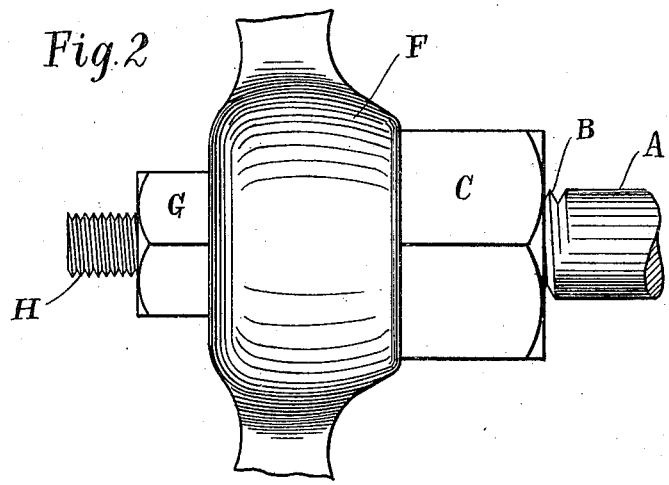

My invention relates to improvements in propeller pullers, and the object of my invention is to provide a cheap, simple, compact and efficient device for pulling propellers from the tail shaft of vessels. I attain this object by the mechanism shown in the accompanying drawings, in which;

Figure 1 is a partial section in elevation of my device. Fig. 2 is an outside elevation of my device.

Similar letters refer to similar parts throughout the several views.

A is the tail shaft (shown in relief).

B is a thread (shown in relief) on tail shaft A.

C is a nut engaging thread B.

D is the cone (shown in relief) at end of tail shaft A.

E is the key in cone D.

F is the propeller boss.

G is the lock nut aft of propeller F.

H is a thread (shown in relief) at the extreme after end of tail shaft A, engaging nut G.

The operation of my device is as follows: Before shipping propeller F, the nut C is screwed onto thread B. Care should be taken to see that nut C is screwed far enough forward on tail shaft A, so that the after face of nut C will clear the forward face of propeller boss F. After nut C is in position, the propeller is shipped on cone D in the usual manner, and nut G is then screwed onto thread H, and set up tight as is the usual practice now. To remove the propeller, unscrew nut G and remove it from the tail shaft. Then screw nut C back against propeller boss F, thereby forcing the propeller off of cone D. As soon as nut C has started propeller boss F off of cone D, the propeller may be lifted off of the tail shaft.

I claim:

In propeller pullers, a thread on the tail shaft ahead of the propeller boss, and a nut engaging on said thread, said nut being adapted to exert a backward pressure on the forward face of the propeller boss.

CIPRIANO ANDRADE, JR.

Witnesses:
 ARTHUR C. JOHNSON,
 ADOLPH WIDDER.

---

Copies of this patent may be obtained for five cents each, by addressing the "Commissioner of Patents, Washington, D. C."